United States Patent [19]

Smith

[11] Patent Number: 5,716,179
[45] Date of Patent: Feb. 10, 1998

[54] NON-ARTICULATED BALL AND TUBE SPRING BIASED TOGGLE

[76] Inventor: Lester Smith, 1039 S. Garland Way, Lakewood, Colo. 80226

[21] Appl. No.: 800,333

[22] Filed: Feb. 14, 1997

[51] Int. Cl.⁶ .................................................. F16B 21/00
[52] U.S. Cl. .................................... 411/342; 411/340
[58] Field of Search ................................ 411/340, 342, 411/346

[56] References Cited

U.S. PATENT DOCUMENTS

| | | |
|---|---|---|
| 632,540 | 9/1899 | Sapmson ................... 411/340 |
| 1,658,959 | 2/1928 | Zifferer . |
| 2,519,511 | 8/1950 | Stelter . |
| 2,540,145 | 2/1951 | Stevens ..................... 411/342 |
| 2,565,391 | 8/1951 | Molat ........................ 411/342 |
| 3,005,645 | 10/1961 | Leverette . |
| 3,168,850 | 2/1965 | Tennican . |
| 3,878,755 | 4/1975 | Coffey . |
| 4,196,883 | 4/1980 | Einhorn et al. . |
| 4,298,298 | 11/1981 | Pontone ..................... 411/342 |
| 4,398,855 | 8/1983 | Hultquist . |
| 4,449,873 | 5/1984 | Barth . |
| 4,579,492 | 4/1986 | Kazino, et al. . |
| 4,662,808 | 5/1987 | Camilleri . |
| 4,943,253 | 7/1990 | Smith . |
| 4,948,314 | 8/1990 | Kurosaki . |
| 4,997,327 | 3/1991 | Cira . |
| 5,054,981 | 10/1991 | Schnedl . |
| 5,139,377 | 8/1992 | Reed . |
| 5,147,166 | 9/1992 | Harker . |
| 5,215,418 | 6/1993 | Trainer et al. . |
| 5,244,324 | 9/1993 | Smith . |
| 5,246,322 | 9/1993 | Salice . |
| 5,261,772 | 11/1993 | Henninger . |

FOREIGN PATENT DOCUMENTS

| | | | |
|---|---|---|---|
| 916372 | 10/1945 | France . | |
| 559768 | 9/1932 | Germany | ............... 411/342 |
| 1296883 | 12/1966 | Germany . | |

*Primary Examiner*—Flemming Saether

[57] ABSTRACT

A toggle member comprising an elongated cylindrical tube having a slot from one end to approximately the center of the tube, defining an opening and channel to receive a fastening bolt; a pivoting threaded bolt engaging with a round ball, the ball threaded to engage the bolt, the ball acting as a pivotally mounted system to allow the bolt to pivot in a manner relocating itself inside and parallel with the tube, said ball being attached to an elastomeric spring bias material tongue fixably seated within the tube so as to exert a spring bias in a direction to force the bolt perpendicular to the tube. The toggle member is meant to be used with a threaded bolt or screw. The elastomeric spring being thinner in the direction facing the bolt entrance allows the bolt to swivel or pivot parallel and into the tube. When the bolt resumes its perpendicular position relative to the tube it is further restricted against the torque exerted by the rotation of the bolt, when the bolt is tightened, by the spring width being greater, in this axis, and having greater strength and moment of inertia, statically restricting the ball from rotating and always keeping it located to its center position within the tube.

3 Claims, 3 Drawing Sheets

NON-ARTICULATED BALL AND TUBE SPRING BIASED TOGGLE

BACKGROUND OF THE INVENTION

The present invention generally relates to toggle anchors for securing hardware to walls having hollow spaces, and specifically relates to non-articulated toggles that pivot about a threaded ball contained within a cylindrical enclosure.

One of the most common problems that construction workers, repairman and homeowners face is that of securing hardware to walls that have a hollow portion. Typically, a nail or screw will not hold fast in plaster, gypsum, thin plywood, metal siding or other such materials that are not backed up by a solid reinforcing member such as a stud, joist or the like. The classic prior art approach to this problem has been that application of the principle of the toggle anchor or toggle bolt. A standard toggle anchor includes a body portion having a retainer bar pivotally attached to its inner end. The retainer bar is usually articulated and pivots about a hinge, being kept in an open axial position by a spring bias. In usage, a hole is drilled through the wall in which the anchor is desired to be secured. The anchor is then folded up against its spring bias about its hinge, positioned into the hole, and moved inward until the retaining bar is through the wall and free thereof so that it then springs and pivots into a securing position. These types of anchors are relatively easily installed and operate effectively to secure the anchor in the wall.

Toggle anchors, though suffer from several disadvantages. Since they are essentially a swinging hinge type of mechanical arrangement, in their folded-up insertion position they still require the user to drill a hole that is substantially larger than the diameter of the bolt itself. Often, this results in the bolt being off-center after the bolt is tightened into position, with the additional result that any object attached to or hanging from the bolt is likewise not correctly positioned. Sometimes the drilled hole is so large in relation to the diameter of the bolt that a washer must be used with the bolt to prevent the bolt head from going through the drilled hole. Another disadvantage with most toggle designs is that they have wing-like portions that are meant to grip into the interior surface of the hollow wall to prevent their spinning around while the bolt is being turned. Sometimes, these wings can gouge so deeply into the interior of the hollow wall that the strength of that area of the wall is compromised and it falls under the stress of a load. Another shortcoming is that there is an inherent weakness at the articulation that presents a point of failure under very great loads.

Other types of toggles rely on the force of gravity to assume an orthogonal position in relation to the bolt. Thus, the toggle may be heavier on one side than the other so that after it is pushed through the drilled hole, the heavier side drops down and the toggle is then orthogonal to the bolt. However, oftentimes hollow walls have debris, or insulation inside that may interfere with the ability of the toggle to deploy under the force of gravity alone. Thus, having a mechanical spring to provide a spring bias is preferable to a gravity-type of toggle.

To overcome the shortcomings of gravity-type toggles and spring-biased articulated toggles, it is necessary to design a non-articulated toggle that still has a sufficiently strong spring bias. Since the prior art articulated toggles all share the common feature of a spring bias in an arctuate path about a hinge axis, it became an object of the present invention to provide for a non-articulated toggle having a spring bias perpendicular to the lengthwise axis of the toggle. Another object of the present invention is to provide a toggle design that significantly reduces the endwise profile so that a smaller hole can be drilled relative to the diameter of the bolt. Yet another object of the present invention is to provide for a toggle having an interior wall contact surface that is less prone to gouge the interior surface of a wall when the bolt is tightened, yet provide sufficient friction to prevent the toggle from simply spinning around while the bolt is being tightened. Still another object of the invention is to reduce the number of mechanical parts needed to fabricate a toggle. An additional object of the invention is to provide a toggle that spreads its load evenly across the entire surface that is in contact with the wall interior.

These and other objects of the invention are met by providing for a non-articulated toggle that features a one-piece slotted tube with ball attached to elastomeric material to act as a spring bias against the ball. Such a construction has the advantages of presenting a smaller end profile, reducing the number of mechanical parts, providing for a high coefficient of friction surface to prevent useless spinning on the interior surface of a wall, and reducing the chance of gouging the interior wall surface. These an other objects, features and advantages of the present invention will be more completely set forth in the following sections.

SUMMARY OF THE INVENTION

In brief summary, the invention is a toggle member comprising an elongated cylindrical tube having a slot from one end to approximately the center of the tube, defining an opening and channel to receive a fastening bolt; a pivoting threaded bolt engaging with a round ball, the ball threaded to engage the bolt, the ball acting as a pivotally mounted system to allow the bolt to pivot in a manner relocating itself inside and parallel with the tube, said ball being attached to an elastomeric spring bias material tongue fixably seated within the tube so as to exert a spring bias in a direction to force the bolt perpendicular to the tube. The toggle member is meant to be used with a threaded bolt or screw. The elastomeric spring being thinner in the direction facing the bolt entrance allows the bolt to swivel or pivot parallel and into the tube. When the bolt resumes its perpendicular position relative to the tube it is further restricted against the torque exerted by the rotation of the bolt, when the bolt is tightened, by the spring width being greater, in this axis, and having greater strength and moment of inertia, statically restricting the ball from rotating and always keeping it located to its center position within the tube.

DETAILED DESCRIPTION OF THE PREFERRED EMBODIMENTS AND BEST MODE OF THE INVENTION

Figure 1:
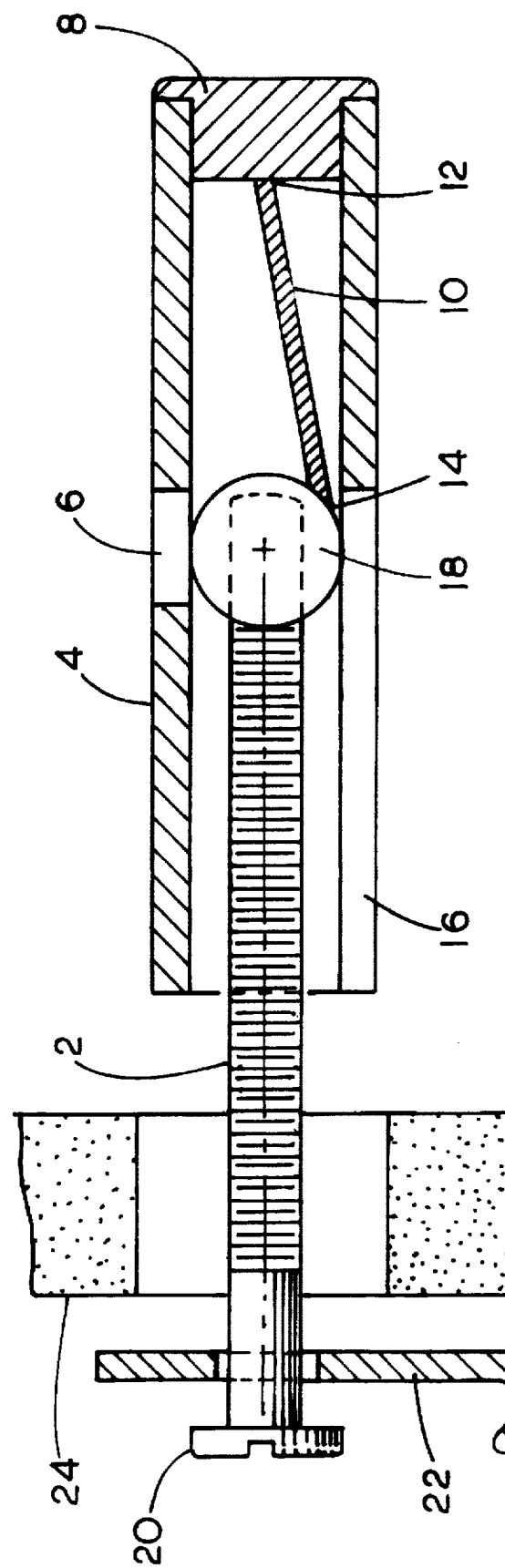
FIG. 1 is a side elevational in partial cutaway view, showing the toggle of the invention, with a bolt partially inserted into the toggle, and the toggle having been rotated so as to be axially aligned with the bolt and the spring bias means being in tension against the bolt.
Figure 2:
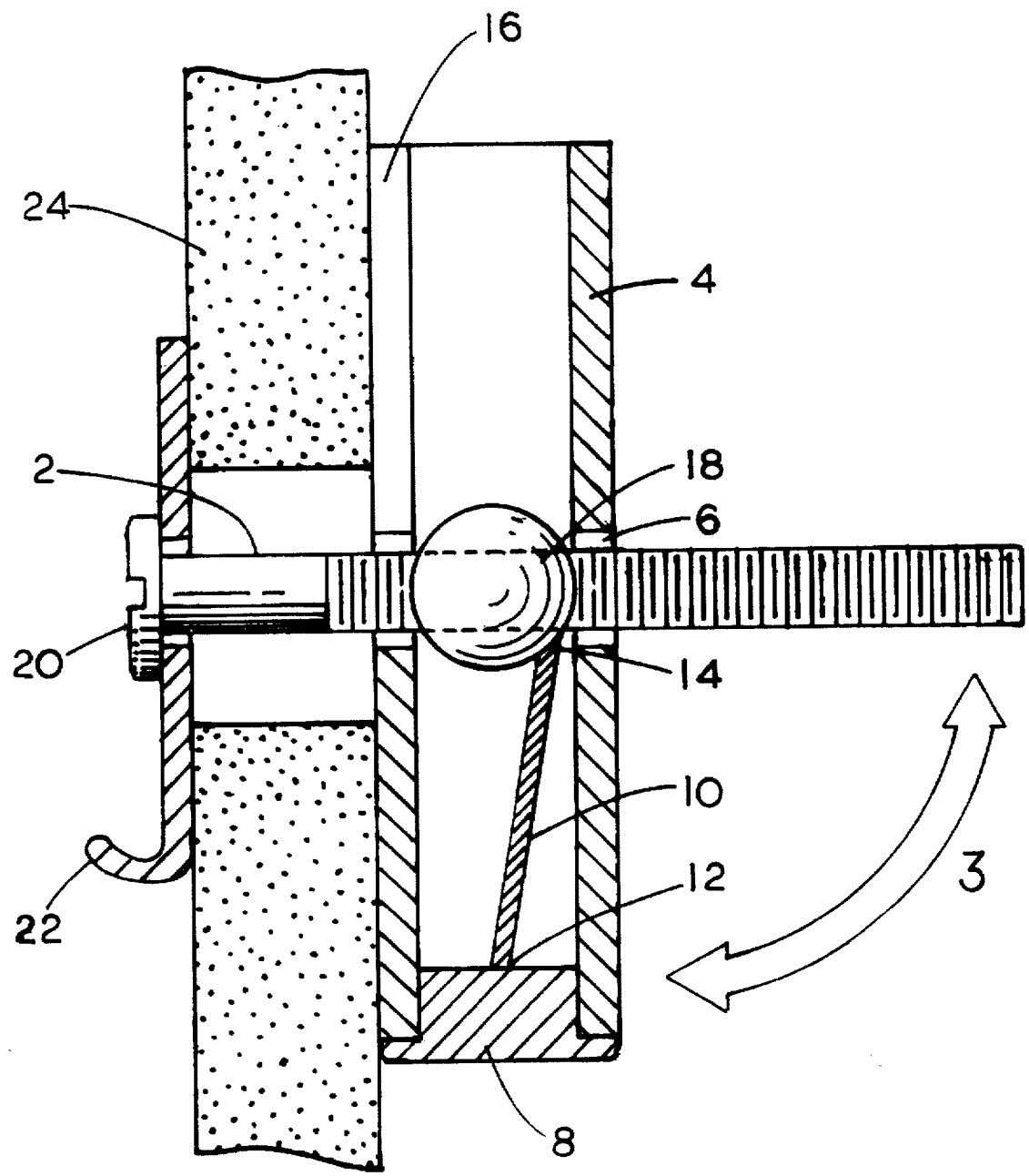
FIG. 2 is a side elevational in partial cutaway view, showing the toggle of the invention, with the toggle perpendicular with respect to the inserted bolt, and the spring bias means being in a relaxed position, showing the toggle having been deployed into its fully orthogonal position, with the bolt having tightened the entire assembly against the wall material.
Figure 3:
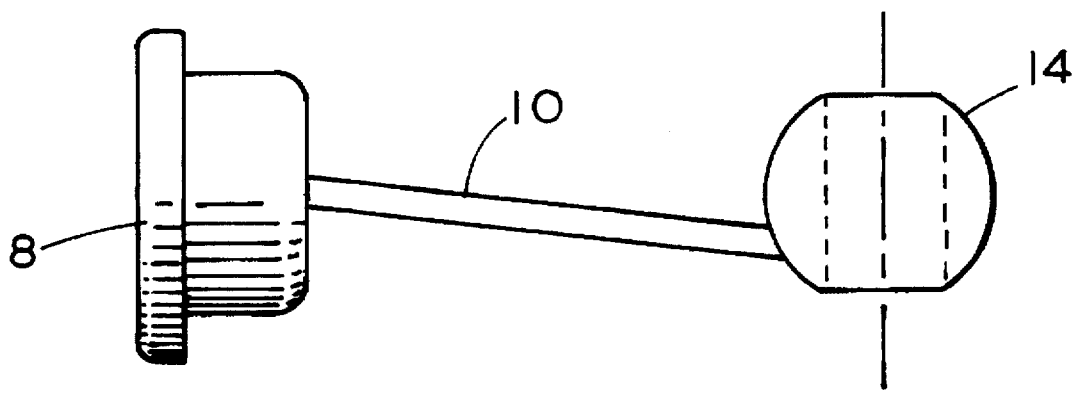
FIG. 3 is a side view of the spring bias/end plug assembly.
Figure 4:
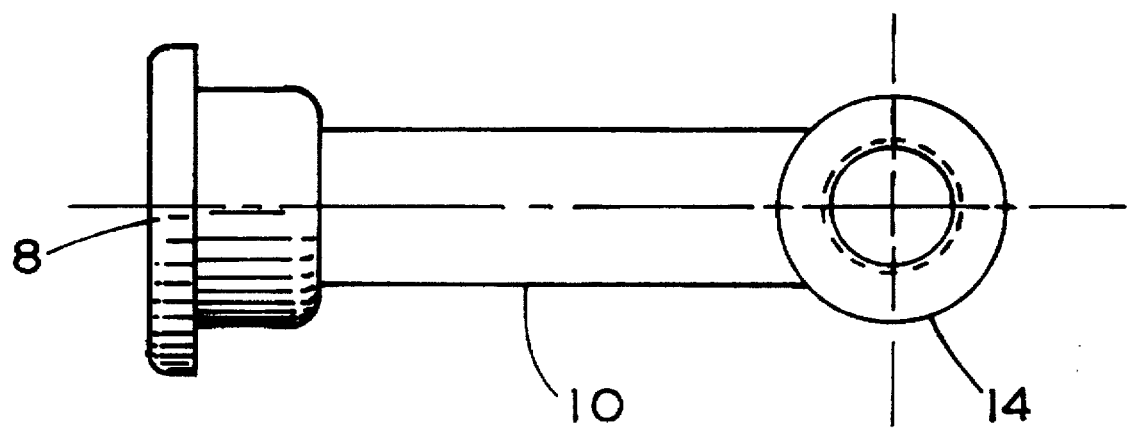
FIG. 4 is a top view of the spring bias/end plug assembly. showing the toggle having been deployed into its fully orthogonal position, with the bolt having tightened the entire assembly against the wall material.

Turning first to FIGS. 1 and 2 there is shown the toggle of the invention generally at 4, being used in combination with a common threaded bolt 2. The term toggle member itself means a crosspiece to serve in holding or tightening a bolt or screw. The bolt 2 has been screwed a slight distance into a helically threaded engaging means 18. Preferably, engaging means 18 is a spherical ball that has been drilled through its axis or has a hole molded that runs through its axis, and has been threaded on its inside surface.

The channel 16 can be formed into a curvilinear form having no angular features. Curvilinear forms can have any desired end profile, so long as a channel is formed through which the shaft of bolt 2 can pass, as further described below.

A spring bias 10 is fixably mounted or seated in the toggle 4. The spring bias 10 is most preferably a substantially flat tongue-like leaf spring of metal or elastomeric composition. The leaf spring has two ends, with a first end fixably anchored at 12 into an end plug 8 that is shown as seated within the toggle 4, and a second end fixably anchored at 14 onto the engaging ball 18. Anchoring can be by any means known to those of skill in the art, including adhesive, or mechanical insertion of a tongue end into a correctly dimensioned groove, or injection molding of the ball, spring and plug as a one piece elastomeric assembly.

In the most preferred embodiment of the invention, the spherical engaging means is held in position with respect to the toggle 4 by spring bias 10, dispensing with the need for pins in the toggle, as is commonly found in the prior art. When a bolt 2 is screwed into engaging means 18, the toggle can then be swung through an arc, with bolt 2 passing through channel or slot 16 until the toggle's linear axis is virtually coaxial with the linear axis of bolt 2. At this point, spring bias means 10 is in tension. The compressed assembly is then pressed through a drilled hole in wall material 24. In FIG. 2, the toggle has now been pressed clear of wall material 24 and the tensioned spring bias with its degree of potential energy has now been released, pulling the toggle 4 perpendicular to the bolt 2, bringing the toggle into a position such that when the bolt 2 is pulled backward or is screwed a further distance through the engaging means 18 by the action of a screwdriver in bolt head 20 until hardware 22 is mounted, then the deployed toggle is brought into contact with the interior surface of wall 24.

While the invention has been described with reference to particular examples and embodiments, it will be apparent that numerous variations, alternatives, and modifications are possible, and accordingly all such variations, alternatives, and modifications are to be regarded as being within the spirit and scope of the present invention.

What is claimed is:

1. A wall fastener assembly for insertion of a threaded bolt or screw through a hole in a wall structure to achieve mounting of hardware to said wall structure, comprising:

an elongated tubular base member having a tubular wall of defined thickness, having a longitudinal axis, having a top end and defining a channel having a bottom and first and second sides, and defining an opening at a bottom end of said tubular base member for receiving a fastening bolt;

pivoting thread engaging means adapted to threadedly engage a bolt, said pivoting thread engaging means pivotally mounted in said channel such that said pivoting thread engaging means can be pivoted into a position in which a threadedly engaged bolt is coaxial with said tubular base member;

a spring bias anchor plug seated in said top end of said tubular base member; and a substantially flat spring means having first and second ends, said first end fixably attached to said spring bias anchor plug and said second end fixably attached to said pivoting thread engaging means, so as to exert a spring bias in a direction perpendicular to a fastening bolt inserted into said pivoting thread engaging means such that when said fastening bolt, having been inserted into said pivoting thread engaging means, is rotated through an arc so as to be parallel with reference to said tubular base member in order to insert the entire assembly into a hole in a wall, said spring bias exerts a force tending to push said tubular base member into a position perpendicular with reference to said bolt.

2. The toggle assembly as claimed in claim 1, wherein said pivoting thread engaging means comprises an internally threaded, spherical member, freely rotatable about an axis without supporting pivot pin means.

3. The toggle assembly as claimed in claim 1, wherein said spring bias means has sufficient flexibility to bow along a direction perpendicular to its length and in a plane parallel to the arc through which said bolt swings with respect to said tubular base member.

* * * * *